United States Patent [19]

Buschmann et al.

[11] Patent Number: 5,558,415
[45] Date of Patent: Sep. 24, 1996

[54] METHOD OF ENHANCING THE RELIABLITY IN OPERATION OF A BRAKE SYSTEM WITH ELECTRONIC CONTROL OF THE BRAKE FORCE DISTRIBUTION

[75] Inventors: Gunther Buschmann, Idstein; Jürgen Woywod, Hattersheim, both of Germany

[73] Assignee: ITT Automotive Europe GmbH, Frankfurt, Germany

[21] Appl. No.: 374,768

[22] PCT Filed: Jul. 22, 1993

[86] PCT No.: PCT/EP93/01942

§ 371 Date: Jan. 27, 1995

§ 102(e) Date: Jan. 27, 1995

[87] PCT Pub. No.: WO94/03351

PCT Pub. Date: Feb. 17, 1994

[30] Foreign Application Priority Data

Jul. 29, 1992 [DE] Germany ............................ 42 24 971.6

[51] Int. Cl.⁶ .............................. B60T 8/32; B60T 8/60; B60T 8/26
[52] U.S. Cl. .................. 303/186; 303/122; 303/122.08; 303/122.09; 303/113.5; 188/349
[58] Field of Search ................................ 303/186, 113.5, 303/122, 165, 122.08, 122.09, 122.1, 122.12, 122.13, 122.14, 164, 157, 199, 190, 188, 187, 9.63, 9.62, 9.69, 20, 113.2; 188/349, 181 C

[56] References Cited

U.S. PATENT DOCUMENTS

| | | | |
|---|---|---|---|
| 4,484,784 | 11/1984 | Leiber | 303/122.08 |
| 4,699,436 | 10/1987 | Klein . | |
| 4,784,443 | 11/1988 | Weise | 303/186 |
| 4,824,182 | 4/1989 | Steffes et al. | 303/122.08 |
| 4,943,123 | 7/1990 | Takeda et al. | 303/186 |
| 5,066,073 | 11/1991 | Frigger et al. . | |
| 5,125,724 | 6/1992 | Steiner | 303/113.2 |
| 5,127,713 | 7/1992 | Birkenbach . | |
| 5,167,441 | 12/1992 | Schonlau et al. . | |
| 5,190,358 | 3/1993 | Holzmann et al. | 303/113.5 |
| 5,219,210 | 6/1993 | Maehara | 303/186 |

FOREIGN PATENT DOCUMENTS

| | | |
|---|---|---|
| 3323402 | 10/1984 | Germany . |
| 3418044 | 4/1986 | Germany . |
| 3728480 | 1/1989 | Germany . |
| 3820440 | 1/1989 | Germany . |
| 3742173 | 6/1989 | Germany . |
| 3901923 | 9/1990 | Germany . |
| 4029332 | 5/1991 | Germany . |
| 4036940 | 8/1991 | Germany . |
| 4007360 | 9/1991 | Germany . |
| 4122282 | 1/1992 | Germany . |
| 4141653 | 6/1992 | Germany . |
| 2135413 | 8/1984 | United Kingdom . |

*Primary Examiner*—Douglas C. Butler
*Attorney, Agent, or Firm*—Ratner & Prestia

[57] ABSTRACT

To enhance the reliability of a brake system with electronic control of the brake force distribution, a short pressure reduction pulse, which is negligible for the braking process, is applied to the front wheels (VR, VL) during a braking operation, and the reaction of the front wheels to the pressure reduction pulse is sensed. If imbalance of the front-wheel brakes or a defect is concluded from the reaction, the limitation of the pressure rise in the wheel brakes of the rear wheels (HR, HL), which is an effect of the brake force distribution control, is minimized or eliminated. Thus, the rear wheels provide an increased contribution to the braking process in this situation.

11 Claims, 1 Drawing Sheet

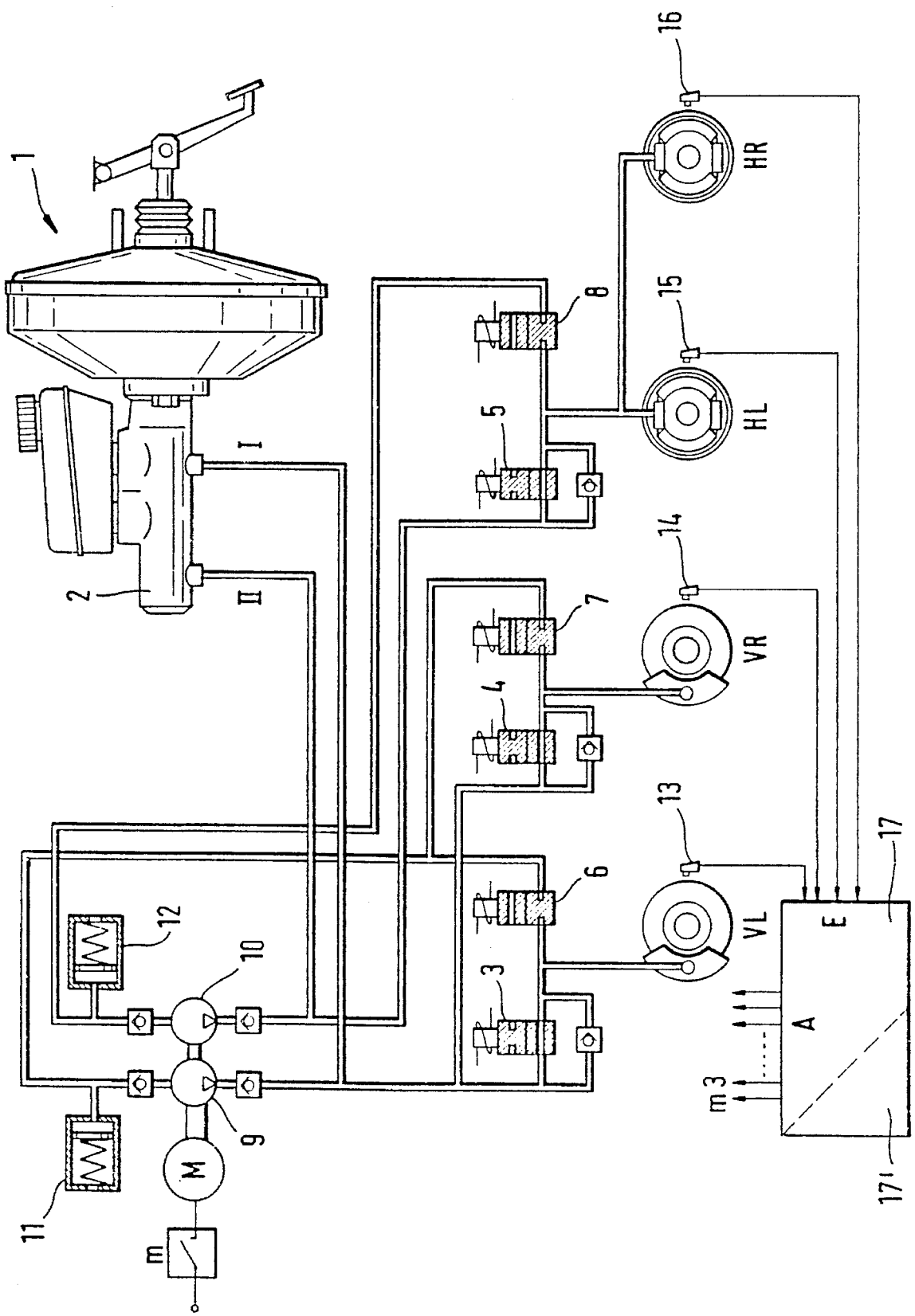

METHOD OF ENHANCING THE RELIABLITY IN OPERATION OF A BRAKE SYSTEM WITH ELECTRONIC CONTROL OF THE BRAKE FORCE DISTRIBUTION

This application is the U.S. national-phase application of PCT International Application No. PCT/EP93/01942.

FIELD OF THE INVENTION

The present invention relates to a method of enhancing the reliability in operation of a brake system with electronic brake force distribution, in which the difference between the slip of the front wheels and the slip of the rear wheels serves as a control quantity.

BACKGROUND OF THE INVENTION

As is known, it is necessary to vary the distribution of brake forces to the front wheels and the rear wheels in order to compensate for static and dynamic axle load shifts. A great variety of mechanical, invariably adjusted pressure reducing valves or load-responsive and/or deceleration-responsive brake force regulators are used for this purpose. However, only a relatively coarse adaptation to the actual axle load distribution may be achieved by the use of these mechanical devices.

German Patent No. 33 23 402 discloses electronic brake force distributors which are equipped with electrically operable hydraulic valves serving to control the pressure variation in the wheel brakes. In the simplest case, the front-wheel brakes are connected directly to the braking pressure generator of the brake system, while the hydraulic conduit leads to the rear-wheel brakes through hydraulic valves. The rotational behavior of the wheels is measured by wheel sensors, and the hydraulic valves are actuated such that the brake slip of the rear wheels remains within a defined relationship to the brake slip of the front wheels. It is preferred in the above referenced patent that the brake slip of the rear wheels is limited by the electronic brake force distribution control to a value of 85 to 97% of the front-wheel brake slip.

An electronic control of this type is advisable in particular in connection with an anti-lock system because the hydraulic valves required for the anti-lock control may be used without modification for the electronic control of brake force distribution as well. The same applies to the wheel sensors. The result is that only minimal extra effort and equipment is required to extend the anti-lock control system to a system with electronic control of the brake force distribution.

However, the disadvantage of controlling the brake force distribution in the described way, i.e. by using as the control quantity the difference between the brake slip of the front axle and the brake slip of the rear axle, is that pressure limitation on the rear wheels commences too early in the event of either brake circuit failure at the front axle or a major brake pressure imbalance between the front-wheel brakes. This disadvantage occurs in particular when both front-wheel brakes are connected to the same pressure fluid circuit, that means in a so-called black and white brake circuit split-up.

Further, German Patent No. 34 18 044 discloses a multiple-circuit hydraulic brake system including wheel sensors, hydraulic valves in the brake lines and a monitoring circuit which, by means of the sensors, determines the reaction of the wheels to brake application and evaluates it for error detection.

SUMMARY OF THE INVENTION

An object of the present invention is to overcome the disadvantage of the above referenced brake system by way of an electronic control of the brake force distribution, without increasing the manufacturing costs or requiring significant extra effort and equipment. It has been discovered that this object can be achieved by generating a front wheel slip and a rear wheel slip; determining a difference between the front wheel slip and the rear wheel slip; limiting brake pressure rise in the rear wheel brakes when the difference exceeds a slip difference threshold; varying the pressure introduced into the front wheel brakes; sensing the wheel rotational behavior of the front wheels in response to the step of varying the pressure introduced into the front wheel brakes and identifying an error; and at least minimizing, upon identification of an error, the effect of the step of limiting brake pressure rise in the rear wheel brakes.

According to an embodiment of the present invention, the reaction of the front wheels to the braking pressure is constantly tested and, upon the occurrence of an error, the electronic control of the brake force distribution is disconnected, i.e. the limitation of the rise in pressure at the rear axle due to a brake slip difference between the front and rear wheels in excess of a limit value is eliminated. An error is identified whenever the expected reaction of the wheel rotational behavior is not sensed. In the event of error, the full braking pressure is applied to the rear wheels which are consequently able to contribute their maximum braking effort to the deceleration of the vehicle.

In a preferred embodiment of the method according to the present invention, the front-wheel brakes may be tested during a braking operation by a short braking pressure reduction pulse which influences braking only imperceptibly. With the system intact, even this short braking pressure reduction pulse results in a reaction of the wheel rotational behavior which can be evaluated.

Expediently, the test pulses are applied consecutively to the two front wheels. This is appropriate particularly in brake systems with a diagonal brake-circuit split-up. The control may be disabled or changed depending on the type and location of the error.

According to a preferred embodiment of the method according to the present invention, if an error is identified from the reaction of the front-wheel brakes to the test pulse, the slip difference threshold, i.e. the difference between the brake slip of the front-wheel brakes and brake slip of the rear-wheel brakes, is raised for the commencement of the control operation by a predetermined, invariable amount or by a value in response to the reaction of the front wheels. The slip difference of the front and rear wheel brakes is determined in a known manner as a function of the maximum wheel speed, the individual rear wheel speed, the vehicle deceleration and the vehicle speed. Thus, the pressure limitation by the electronic brake force distribution control commences in this case only in the event of a greater difference of slip values between front axle and rear axle.

According to still another embodiment of the present invention, the slip difference threshold for the commencement of the electronic brake force distribution control is varied in dependence on the reaction of the wheel rotational behavior to the test pulses, and the electronic brake force distribution control is disabled when a disablement threshold is exceeded. The disablement threshold is determined in a known manner and is typically reached after the slip difference threshold has been reached. The disablement threshold is reached upon total failure of the front-wheel brakes or upon considerable reduction of the brake effect.

BRIEF DESCRIPTION OF THE DRAWING

Further features, advantages and possible applications of the present invention can be seen in the following description with reference to a simplified schematic view which shows the most important component parts of a brake system with anti-lock control and electric control of the brake force distribution.

DETAILED DESCRIPTION OF THE INVENTION

The drawing shows an anti-lock brake system with electronic control of the brake force distribution to the front axle and the rear axle. The essential components of the brake system are a braking pressure generator 1 including a tandem master cylinder 2, to which the wheel brakes are connected in two closed hydraulic brake circuits I, II, independent of each other, in the so-called black and white split-up. Electromagnetically operable inlet valves 3, 4, 5 and outlet valves 6, 7, 8 are inserted into the brake lines. Further, a dual-circuit hydraulic pump 9, 10 with a joint electric drive motor M and low-pressure accumulators 11, 12 are provided. In addition, the brake system is equipped with sensors 13 to 16, one for each individual wheel, the signals of which are delivered to an electronic control unit 17 which processes and evaluates the sensor signals and generates front and rear wheel slip values, the difference between these values, and the braking pressure control signals. Through the indicated outputs A of the control unit, the braking pressure control signals are supplied to the electrically operable hydraulic valves 3 to 8 and, through a relay m, to the drive motor M of the hydraulic pump 9, 10.

In a known manner, the pressure fluid which is discharged through the outlet valves 6 to 8 in the braking pressure reduction mode is returned into the brake circuits I, II by means of the hydraulic pump 9, 10 which operates only during anti-lock control operation. The low-pressure accumulators 11, 12 serve as intermediate accumulators in the pressure reduction mode. Each of the two front wheels VL, VR is connected to the brake circuit I through one pair of inlet valves 3, 4 and outlet valves 6, 7, while the rear wheels HL, HR are connected to the brake circuit II through one joint valve pair 5, 8.

The electronic control of the brake force distribution in dependence on the brake slip or the difference of the brake slip at the front axle and the rear axle is also performed by means of the control unit 17. To this end, the control unit is provided with additional circuits, which are indicated by section 17' of the control unit, or the control unit is programmed correspondingly if microcomputers are provided for signal processing. The circuits 17' or the corresponding program parts also implement the method according to the present invention. To carry out the testing operations, a short pressure reduction pulse, which practically has no effect on braking, is applied to the inlet/outlet valve pair 3, 6 or 4, 7 of one or both of the front wheels VL, VR during a partial braking operation, i.e. a braking operation without anti-lock control, and the reaction of the wheel to the pressure reduction pulse is determined by means of sensors 13 or 14.

If, as a reaction to the short pressure reduction pulse, the wheel rotational behavior of one or both of the front wheels VL, VR identifies a major imbalance of one or both of the front-wheel brakes or even failure of the brake circuit I, the circuits 17' will intervene in the control of the brake force distribution. The limitation of the braking pressure rise at the rear wheels will be discontinued by discontinuing the actuation of the inlet valve 5 so that it remains in its inactive position or open position.

Depending on the type of the error detected by the reaction of the front wheels, the slip difference threshold for the commencement of the brake force distribution control may also be raised. In this case, the amount of brake slip at the rear wheels, at the attainment of which the electronic brake force distribution control commences, may be increased.

The method according to the present invention permits detecting all errors which lead to insufficient brake forces at the front axle. In addition to a state of imbalance of the brakes and a total failure of the front-axle brake circuit, leakage through the outlet valves 6 or 7 or erroneous closing of the inlet valves 3, 4, for example, is detected.

Thus, the present invention enhances the reliability in operation of a brake system with electronic control of the brake force distribution in a very simple fashion by only supplementing or programming the electronics of the control unit 17, 17' correspondingly. Any objections which were raised, with respect to safety aspects, against the electronic control of the brake force distribution (which previously, on failure of the front-wheel brakes, resulted in a longer stopping distance due to insufficient braking of the rear axle) are overcome.

We claim:

1. A method for enhancing the reliability of a brake system with electronic brake force distribution control for an automotive vehicle having front wheels and rear wheels and front wheel brakes and rear wheel brakes, respectively associated with said front wheels and said rear wheels, said method comprising the steps of:

generating a front wheel slip and a rear wheel slip;

determining a difference between said front wheel slip and said rear wheel slip;

limiting brake pressure rise in said rear wheel brakes when said difference exceeds a slip difference threshold;

varying the pressure introduced into said front wheel brakes;

sensing the wheel rotational behavior of said front wheels in response to the step of varying the pressure introduced into said front wheel brakes and identifying an error; and at least minimizing, upon identification of an error, the effect of the step of limiting brake pressure rise in said rear wheel brakes.

2. A method in accordance with claim 1, wherein:

the step of varying the pressure introduced into said front wheel brakes includes reducing brake pressure of the front wheel brakes by at least one short braking pressure reduction pulse during a braking operation; and the step of sensing the wheel rotational behavior of said front wheels and identifying an error includes evaluating the change in the wheel rotational behavior of said front wheels.

3. A method in accordance with claim 2, wherein said at least one short braking pressure reduction pulse is applied consecutively to both front wheel brakes.

4. A method in accordance with claim 1, wherein the step of at least minimizing the effect of the step of limiting brake pressure rise in said rear wheel brakes includes raising said slip difference threshold thereby delaying the commencement of the step of limiting brake pressure rise in said rear wheel brakes.

5. A method in accordance with claim 4 wherein said slip difference threshold is raised by a predetermined, invariable amount.

6. A method in accordance with claim 4 wherein said slip difference threshold is raised by a value which depends on the reaction of the front wheels to the braking pressure variation.

7. A method in accordance with claim 1 wherein the step of at least minimizing the effect of the step of limiting brake pressure rise in said rear wheel brakes includes:

varying said slip difference threshold in dependence on the reaction of the wheel rotational behavior to the step of varying the pressure introduced into said front wheel brakes; and eliminating the step of limiting brake pressure rise in said rear wheel brakes when a disablement threshold is exceeded.

8. A method in accordance with claim 1 wherein the step of varying the pressure introduced into said front wheel brakes is performed at regular intervals.

9. A method in accordance with claim 1, wherein the step of varying the pressure introduced into said front wheel brakes is performed in dependence on recurrent events.

10. A method in accordance with claim 1, wherein the step of identifying an error includes identifying a reaction of said front wheel brakes which is below a predetermined limit value.

11. A method in accordance with claim 1, wherein the step of at least minimizing, upon identification of an error, the effect of the step of limiting brake pressure rise in said rear wheel brakes includes eliminating the step of limiting brake pressure rise in said rear wheel brakes.

* * * * *